US005900989A

United States Patent [19]

Kreitzer

[11] Patent Number: 5,900,989

[45] Date of Patent: May 4, 1999

[54] MINI-ZOOM PROJECTION LENSES FOR USE WITH PIXELIZED PANELS

[75] Inventor: Melvyn H. Kreitzer, Cincinnati, Ohio

[73] Assignee: U.S. Precision Lens Inc., Cincinnati, Ohio

[21] Appl. No.: 08/908,118

[22] Filed: Aug. 11, 1997

Related U.S. Application Data

[60] Provisional application No. 60/024,083, Aug. 16, 1996, and provisional application No. 60/037,266, Jan. 31, 1997.

[51] Int. Cl.$^6$ .......................... G02B 15/14; G02B 13/18

[52] U.S. Cl. .......................... 359/691; 359/649; 359/663; 359/708

[58] Field of Search .......................... 359/691, 663, 359/708, 714, 649, 713, 650, 651

[56] References Cited

U.S. PATENT DOCUMENTS

| | | | |
|---|---|---|---|
| 4,189,211 | 2/1980 | Taylor | 359/663 |
| 4,425,028 | 1/1984 | Gagnon et al. | 359/246 |
| 4,461,542 | 7/1984 | Gagnon | 349/8 |
| 4,826,311 | 5/1989 | Ledebuhr | 353/31 |
| 5,042,929 | 8/1991 | Tanaka et al. | 359/708 |
| 5,179,473 | 1/1993 | Yano et al. | 359/691 |
| 5,200,861 | 4/1993 | Moskovich | 359/662 |
| 5,218,480 | 6/1993 | Moskovich | 359/753 |
| 5,278,698 | 1/1994 | Iizuka et al. | 359/682 |
| 5,313,330 | 5/1994 | Betensky | 359/676 |
| 5,331,462 | 7/1994 | Yano | 359/689 |
| 5,625,495 | 4/1997 | Moskovich | 359/663 |
| 5,644,435 | 7/1997 | Shikama | 359/649 |

FOREIGN PATENT DOCUMENTS

| | | |
|---|---|---|
| 311116 | 12/1989 | European Pat. Off. . |
| WO97/41461 | 11/1997 | WIPO . |

OTHER PUBLICATIONS

*The Handbook of Plastic Optics,* U.S. Precision Lens, Inc., Cincinnati, Ohio, 1983, pp. 17–29.

*Primary Examiner*—Scott J. Sugarman
*Attorney, Agent, or Firm*—Maurice M. Klee

[57] ABSTRACT

Projection lenses for use with pixelized panels, e.g., LCD panels, are provided. The lenses have a large focus range, e.g., a focus range of greater than 0.05 and in many cases greater than 0.1, and a limited (mini) zoom range, e.g., a zoom range of less than 15% (±7.5% from the center of the range). By limiting the zoom range, complex lens structures involving large numbers of lens elements are avoided. In particular, the lenses employ at most one additional lens element and in many cases no additional lens elements compared to non-zooming lenses having a similar focus range.

16 Claims, 6 Drawing Sheets

MINI-ZOOM PROJECTION LENSES FOR USE WITH PIXELIZED PANELS

CROSS REFERENCE TO RELATED PROVISIONAL APPLICATION

This application claims the benefit under 35 USC §119(e) of U.S. Provisional Applications Ser. Nos. 60/024,083 filed Aug. 16, 1996 and Ser. No. 60/037,266 filed Jan. 31, 1997.

FIELD OF THE INVENTION

This invention relates to projection lenses and, in particular, to projection lenses which can be used, inter alia, to form an image of an object composed of pixels, e.g., a LCD.

BACKGROUND OF THE INVENTION

Projection lens systems (also referred to herein as "projection systems") are used to form an image of an object on a viewing screen. Such systems can be of the front projection or rear projection type, depending on whether the viewer and the object are on the same side of the screen (front projection) or on opposite sides of the screen (rear projection)

The basic structure of a projection lens system for use with a pixelized panel is shown in FIG. 6, where 10 is a light source (e.g., a tungsten-halogen lamp), 12 is illumination optics which forms an image of the light source (hereinafter referred to as the "output" of the illumination system), 14 is the object (pixelized panel) which is to be projected (e.g., a LCD matrix of on and off pixels), and 13 is a projection lens, composed of multiple lens elements, which forms an enlarged image of object 14 on viewing screen 16, e.g., an image which is between 3 and 35 times larger. The system can also include a field lens, e.g., a Fresnel lens, in the vicinity of the pixelized panel to appropriately locate the exit pupil of the illumination system.

For front projection systems, the viewer will be on the left side of screen 16 in FIG. 6, while for rear projection systems, the viewer will be on the right side of the screen. For rear projection systems which are to be housed in a single cabinet, a mirror is often used to fold the optical path and thus reduce the system's overall size.

Projection lens systems in which the object is a pixelized panel are used in a variety of applications, including data display systems. Such projection lens systems preferably employ a single projection lens which forms an image of, for example, a single panel having red, green, and blue pixels. In some cases, e.g., large image rear projection systems, multiple panels and multiple projection lenses are use, with each panel/projection lens combination producing a portion of the overall image.

There exists a need in the art for projection lenses for use with pixelized panels which simultaneously have at least the following properties:

(1) the ability to operate (focus) over a wide range of magnifications (conjugates) while maintaining an efficient coupling to the output of the illumination system and a high level of aberration correction (hereinafter referred to as the "lens' focus range");

(2) the ability to provide a range of magnifications for any set of conjugates in the lens' focus range while again maintaining an efficient coupling to the output of the illumination system and a high level of aberration correction (hereinafter referred to as the "lens' zoom range");

(3) a relatively simple construction, i.e., a relatively small number of lens elements;

(4) a high level of color correction;

(5) low distortion; and (6) low sensitivity to temperature changes.

A projection lens which can efficiently operate over a wide range of magnifications, i.e., a lens which has a large focus range, is desirable since it allows the projection system to be used with screens of different sizes and halls of different dimensions without the need to change any of the components of the system. Only the object and image conjugates need to be changed which can be readily accomplished by moving the lens relative to the pixelized panel. The challenge, of course, is to provide efficient coupling to the output of the illumination system and a high level of aberration correction throughout the operative range of magnifications.

The ability to change the magnification of the image for a given set of image and object conjugates, i.e., the ability to zoom, has similar benefits. In this case, the changes in magnification are used for fine tuning of the image to, for example, fully fill a viewing screen. Also, in the case of rear projection systems employing multiple panels and multiple projection lenses, zooming can be used to minimize magnification variations between different portions of the overall image.

It should be noted that while properties (1) and (2) above, i.e., focusing and zooming, both involve magnification changes, the magnification changes are achieved in fundamentally different ways. Thus, during focusing, the focal length of the lens remains constant as the image and object conjugates change, and the magnification change is a result of the change in the ratio of those conjugates. During zooming, on the other hand, the focal length changes while the image and object conjugates remain constant, and the magnification change is a result of the change in the focal length. (Note that in Tables 1–2 below, the focal lengths shown include the Fresnel lens which remains fixed during focusing (and zooming). As a result, the focal length of the lens appears to change during focusing, when in fact it is remaining constant for the lens elements which move during focusing. Also, the lenses of the tables include means for accommodating for changes in the focus of the lens resulting from zooming. In particular, the tables show some changes in conjugates during zooming which achieve these focus corrections.)

Property (3) above, i.e., a relatively simple construction, is desirable from a cost, weight, and size point of view. Large numbers of lens elements consume more raw materials, weigh more, and are more expensive to build and mount. Accordingly, a lens with a minimum number of lens elements is desired.

As is well known in the art, lenses which are capable of zooming generally employ numerous elements in a complex structure to simultaneously provide focal length changes and aberration correction. Accordingly, properties (2) and (3) above work against one another in arriving at a suitable lens design.

In accordance with the invention, it has been found that a mini-zoom range, e.g., a zoom range in terms of image height at the viewing screen (object height in the tables) of 15% or less (±7.5% or less from the center point of the zoom range), is sufficient to meet the great majority of the zooming needs of users of LCD projection lens systems. Moreover, it has been further found that such mini-zoom ranges can be achieved using simple lens designs which employ at most one additional lens element and, in many cases, no additional lens elements than a fixed focal length design which can achieve a similar image quality over a similar focus range. By means of these aspects of the invention, the incompatibility of properties (2) and (3) has been overcome.

Property (4), i.e., a high level of color correction, is important because color aberrations can be easily seen in the image of a pixelized panel as a smudging of a pixel or, in extreme cases, the complete dropping of a pixel from the image. These problems are typically most severe at the edges of the field.

All of the chromatic aberrations of the system need to be addressed, with lateral color, chromatic variation of coma, and chromatic aberration of astigmatism typically being most challenging. Lateral color, i.e., the variation of magnification with color, is particularly troublesome since it manifests itself as a decrease in contrast, especially at the edges of the field. In extreme cases, a rainbow effect in the region of the full field can be seen.

In projection systems employing cathode ray tubes (CRTs) a small amount of (residual) lateral color can be compensated for electronically by, or example, reducing the size of the image produced on the face of the red CRT relative to that produced on the blue CRT. With a pixelized panel, however, such an accommodation cannot be performed because the image is digitized and thus a smooth adjustment in size across the full field of view is not possible. A higher level of lateral color correction is thus needed from the projection lens.

The use of a pixelized panel to display data leads to stringent requirements regarding the correction of distortion. This is so because good image quality is required even at the extreme points of the field of view of the lens when viewing data. As will be evident, an undistorted image of a displayed number or letter is just as important at the edge of the field as it is at the center. Moreover, projection lenses are often used with offset panels, the lenses of the examples being designed for such use. In such a case, the distortion at the viewing screen does not vary symmetrically about a horizontal line through the center of the screen but can increase monotonically from, for example, the bottom to the top of the screen. This effect makes even a small amount of distortion readily visible to the viewer.

Low distortion and a high level of color correction are particularly important when an enlarged image of a WINDOWS type computer interface is projected onto a viewing screen. Such interfaces with their parallel lines, bordered command and dialog boxes, and complex coloration, are in essence test patterns for distortion and color. Users readily perceive and object to even minor levels of distortion or color aberration in the images of such interfaces.

In order to produce an image of sufficient brightness, a substantial amount of light must pass through the projection lens. As a result, a significant temperature difference normally exists between room temperature and the lens' operating temperature. In addition, the lens needs to be able to operate under a variety of environmental conditions. For example, projection lens systems are often mounted to the ceiling of a room, which may comprise the roof of a building where the ambient temperature can be substantially above 40° C. To address these effects, a projection lens whose optical properties are relatively insensitivity to temperature changes is needed.

One way to address the temperature sensitivity problem is to use lens elements composed of glass. Compared to plastic, the radii of curvature and the index of refraction of a glass element generally change less than those of a plastic element. However, glass elements are generally more expensive than plastic elements, especially if aspherical surfaces are needed for aberration control. They are also heavier. As described below, plastic elements can be used and temperature insensitivity still achieved provided the powers and locations of the plastic elements are properly chosen.

The projection lenses described below achieve all of the above requirements and can be successfully used in producing relatively low cost projection lens systems capable of forming a high quality color image of a pixelized panel on a viewing screen.

DESCRIPTION OF THE PRIOR ART

Projection lenses for use with pixelized panels are described in various patents including Taylor, U.S. Pat. No. 4,189,211, Tanaka et al., U.S. Pat. No. 5,042,929, Yano et al., U.S. Pat. No. 5,179,473, Moskovich, U.S. Pat. No. 5,200,8611, Moskovich, U.S. Pat. No. 5,218,480, Iizuka et al., U.S. Pat. No. 5,278,698, Betensky, U.S. Pat. No. 5,313, 330, and Yano, U.S. Pat. No. 5,331,462.

Discussions of LCD systems can be found in Gagnon et al., U.S. Pat. No. 4,425,028, Gagnon, U.S. Pat. No. 4,461, 542, Ledebuhr, U.S. Pat. No. 4,826,311, and EPO Patent Publication No. 311,116.

SUMMARY OF THE INVENTION

In view of the foregoing, it is an object of the present invention to provide improved projection lenses for use with pixelized panels which simultaneously have each of the six desired properties discussed above. This object is achieved by means of a projection lens which has a large focus range and a small zoom range (a mini-zoom range) over the focus range.

As used herein, the focus range F of a projection lens is defined as:

$$F=\max|h_O/h_I|-\min|h_O/h_I|,$$

where $h_O$ is the object height, $h_I$ is the magnified image height, and $\max|h_O/h_I|$ and $\min|h_O/h_I|$ are the maximum and minimum magnitudes, respectively, of the image-to-object magnification (minification) which the projection lens can achieve while maintaining a desired level of image quality.

A preferred level of image quality comprises a distortion of less than 1%, more preferably less than 0.5%, a lateral color blur of less than a half a pixel over the range from 470 nanometers to 630 nanometers, and an axial color blur of less than two pixels again over the range from 470 nanometers to 630 nanometers. (Note that these criteria for color correction can be applied at the object or at the image, a magnified pixel being used when the criteria are applied at the image. Also note that the criterion for axial color blur is less stringent than that for lateral color blur since axial color manifests itself as a symmetric halo which normally is not readily detected by the user.)

As used herein, the zoom range Z of a projection lens is defined as:

$$Z=2*(\max|h_I|-\min|h_I|)/(\max|h_I|+\min|h_I|),$$

where $\max|h_I|$ and $\min|h_I|$ are the maximum and minimum magnitudes, respectively, of the image height as a result of zooming about a $|h_O/h_I|$ ratio in the focus range.

As is well known in the art, any lens which is capable of zooming can be "pushed" beyond its intended zoom range. Such "pushing", of course, leads to a degradation in the performance of the lens. The degradation, however, is generally not precipitous and generally does not affect all performance parameters at the same rate.

Accordingly, as used herein, the zoom range of a projection lens is that range of zooming for which if the range were to be increased by 50%, e.g., to 22.5% for a 15% range (see below), at least at some point in such an increased range, either the distortion would increase above 1% and/or the lateral color blur would increase above half a pixel in the range from 470 nanometers to 630 nanometers and/or the axial color blur would increase above two pixels again in the range from 470 nanometers to 630 nanometers and/or the movement of lens elements would be restricted by the physical structure of the lens and its supporting structures.

In terms of the above F and Z parameters, the projection lenses of the invention comprise:

(A) a first lens unit at the image end of the projection lens, the image end of the unit being separated from the pixelized panel by an axial distance D; and (B) a second lens unit for zooming located between the first lens unit and the pixelized panel, the image end of this unit being separated from the object end of the first unit by an axial distance $D_{12}$;

wherein:

(i) focusing of the projection lens comprises varying the axial distance D;

(ii) zooming of the projection lens comprises varying the axial distance $D_{12}$;

(iii) $F>0.05$; and (iv) the maximum value of Z over the focus range ($Z_{MAX}$) is less than 0.15.

In certain embodiments of the invention, $F>0.1$ and/or $Z_{MAX}<0.1$.

The projection lenses of the invention are preferably designed using the location of the output of the illumination system as a pseudo-aperture stop/entrance pupil of the projection lens (see Betensky, U.S. Pat. No. 5,313,330, the relevant portions of which are incorporated herein by reference). In this way, efficient coupling is achieved between the light output of the illumination system and the projection lens.

In accordance with these embodiments, the invention provides a projection lens system which forms an image of an object and comprises:

(a) an illumination system comprising a light source and illumination optics which forms an image of the light source, said image being the output of the illumination system;

(b) a pixelized panel which comprises the object; and (c) a projection lens of the type described above, said projection lens having an entrance pupil whose location substantially corresponds to the location of the output of the illumination system.

The projection lenses of the invention are also designed to be substantially athermal. As discussed fully below, this is done by using glass and plastic lens elements and by balancing the powers of the plastic lens elements having substantial optical power. In this way, changes in the power of the positive lens elements caused by temperature changes are compensated for by changes in the power of the negative lens elements, thus providing substantially constant overall optical properties for the projection lens as its temperature changes.

Figure 1:
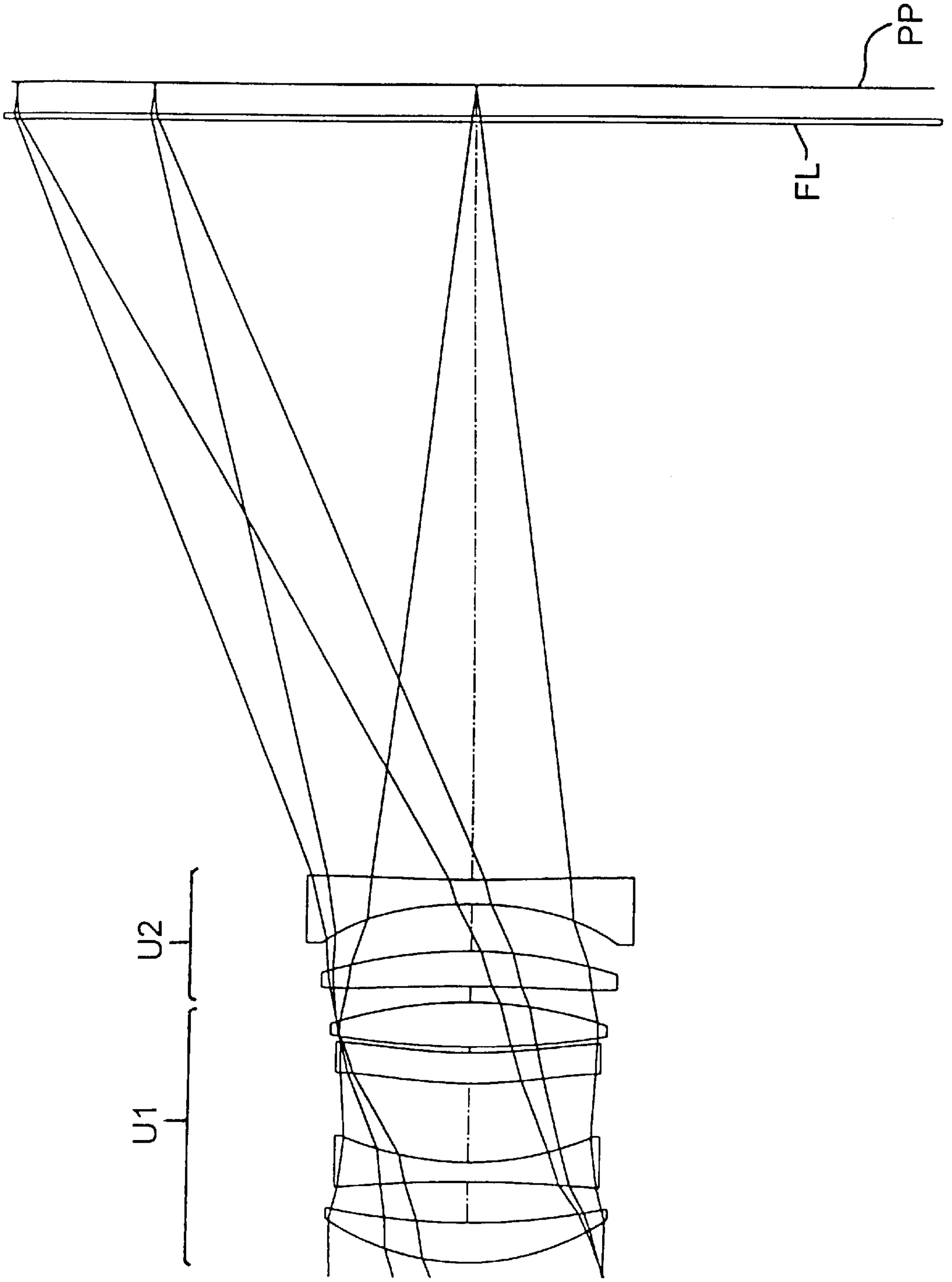
FIGS. 1–5 are schematic side views of projection lenses constructed in accordance with the invention.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

As discussed above, a critical aspect of the invention is the limiting of the projection lens' zoom range so that the lens can have a relatively simple structure. In particular, the zoom range of the lenses of the invention is at most 15% (±7.5% from the center of the zoom range) and in many cases much smaller than 15%.

By so limiting the zoom range, it has been found possible to design the lenses of the invention by: 1) designing a non-zooming lens which will achieve the desired focus range, 2) selecting a lens unit of such a design which will be moved during zooming, and 3) reoptimizing the design with the selected lens unit being moved to achieve the desired zoom range. In practice, it has been found that the zooming version of the lens requires the addition of at most one lens element and, in many cases, no lens element, to achieve the desired limited zooming while still maintaining the desired focus range.

As illustrated by the examples presented below, the limited zooming of the invention is achieved by providing the projection lens with a first lens unit and a second lens unit which are moved relative to one another for zooming. If desired, the projection lens can include additional lens units, e.g., the lens unit following the second lens unit of Examples 4 and 5 below. Focusing of the lenses of the invention is accomplished by moving the entire lens relative to the pixelized panel. In some embodiments, the first lens unit comprises two subunits, and relative movement of those subunits is also used for focusing. Conventional mechanisms known in the art are used to move the lens relative to the pixelized panel and to move the lens' units and subunits relative to one another.

The projection lens includes at least one aspheric surface and, preferably, multiple aspheric surfaces for use in aberration correction, including correction of spherical aberration, astigmatism, coma, and distortion. As discussed above, the system's distortion needs to be highly corrected for lens systems used with pixelized panels and is preferably better than about 1.0 percent and more) preferably better than about 0.5 percent throughout the focus range (and zoom range).

For purposes of color correction, the projection lenses will generally include a negative lens element composed of a high dispersion material and at least one positive lens element composed of a low dispersion material. The high and low dispersion materials can be glass or plastic.

In general terms, a high dispersion material is a material having a dispersion like flint glass and a low dispersion material is a material having a dispersion like crown glass. More particularly, high dispersion materials are those having V-values ranging from 20 to 50 for an index of refraction in the range from 1.85 to 1.5, respectively, and low dispersion materials are those having V-values ranging from 35 to 75 for the same range of indices of refraction.

For plastic lens elements, the high and low dispersion materials can be styrene and acrylic, respectively. Other plastics can, of course, be used if desired. For example, in place of styrene, polycarbonates and copolymers of polystyrene and acrylic (e.g., NAS) having flint-like dispersions can be used. See *The Handbook of Plastic Optics,* U.S. Precision Lens, Inc., Cincinnati, Ohio, 1983, pages 17–29.

As discussed above, the projection lenses of the invention are athermalized so that the optical performance of the system does not substantially change as the projection lens is heated from room temperature to its operating temperature. More specifically, the thermally-induced change in the modulation transfer function of the system at the system's characteristic spatial frequency is preferably less than about 25%, where the characteristic spatial frequency is equal to one over twice the pixel size. The desired thermal stabilization is achieved through the selection and placement in the lens of the plastic lens elements.

Ordinarily, the use of plastic lens elements has the drawback that the refractive index of plastic optical materials changes significantly with temperature. Another effect is the change in shape, i.e., expansion or contraction, of plastic optical materials with temperature. This latter effect is usually less significant than the change in index of refraction.

If only low power plastic lens elements are used in a lens it is possible to achieve a balance between the thermal changes in the plastic optics and the thermal changes in the plastic or aluminum mechanical components of the system, e.g., the lens barrel which is usually the major mechanical source of thermally-caused focus changes. The unrestricted use of optical plastics in a design, i.e., the ability to use plastic lens elements of relatively high power, has advantages in that, since the plastic lens elements can be readily molded, non-spherical optical surfaces (aspherics) can be used to maximize the capability (performance) of a particular lens design. The use of relatively high power plastic elements also leads to a lens having an overall lower cost and lower weight, especially where the lens design involves large lens elements.

If the net plastic optical power in a design is significant, then athermalization needs to be performer or the focus of the lens will change significantly as the lens' temperature changes from room temperature to its operating temperature. This is especially so with projectors which must transmit significant amounts of light to a viewing screen and thus have an operating temperature significantly above room temperature.

For the projection lenses of the present invention, athermalization is achieved by balancing positive and negative plastic optical power, while also taking into account both the location of the plastic lens elements and the marginal ray heights at those elements.

The location of the plastic lens elements is significant in terms of the amount of temperature change the element will undergo and thus the amount of change which will occur in the element's index of refraction. In general, elements close to the light source or the image of the light source will undergo greater temperature changes. In practice, a temperature distribution in the region where the projection lens is to be located is measured with the light source and its associated illumination optics operating and those measured values are used in the design of the projection lens.

The marginal ray height at a particular plastic lens element determines, for a given thermal change, whether changes in the element's index of refraction will be significant with regard to the overall thermal stability of the lens. Elements for which the marginal ray height is small, e.g., elements near the focus of the system, will in general have less effect on the overall thermal stability of the system than elements for which the marginal ray height is large.

Based on the foregoing considerations, athermalization is achieved by balancing the amount of negative and positive power in the plastic lens elements with the contributions of particular elements being adjusted based on the temperature change which the element is expected to undergo and the marginal ray height at the element. In practice, this athermalization procedure is incorporated into a computerized lens design program as follows. First, a ray trace is performed at a first temperature distribution and a back focal distance is calculated. The ray trace can be a paraxial ray trace for the marginal ray. Second, the same ray trace is performed at a second temperature distribution and the back focal distance is again calculated. Neither the first nor the second temperature distribution need be constant over the entire lens but can, and in the typical case does, vary from lens element to lens element. The calculated back focal distances are then constrained to a constant value as the design of the system is optimized using the lens design program.

It should be noted that the foregoing approach assumes that the mechanical mounts for the projection lens and the pixelized panel hold the distance between the last lens surface and the panel substantially constant as the temperature of the system changes. If such an assumption is not warranted, other provisions can be made for performing the athermalization, e.g., a measured value for the relative movement of the mechanical mounts can be included in the process or an alternate distance, e.g., the distance between the front lens surface and the panel, can be assumed to be mechanically fixed.

Figure 2:
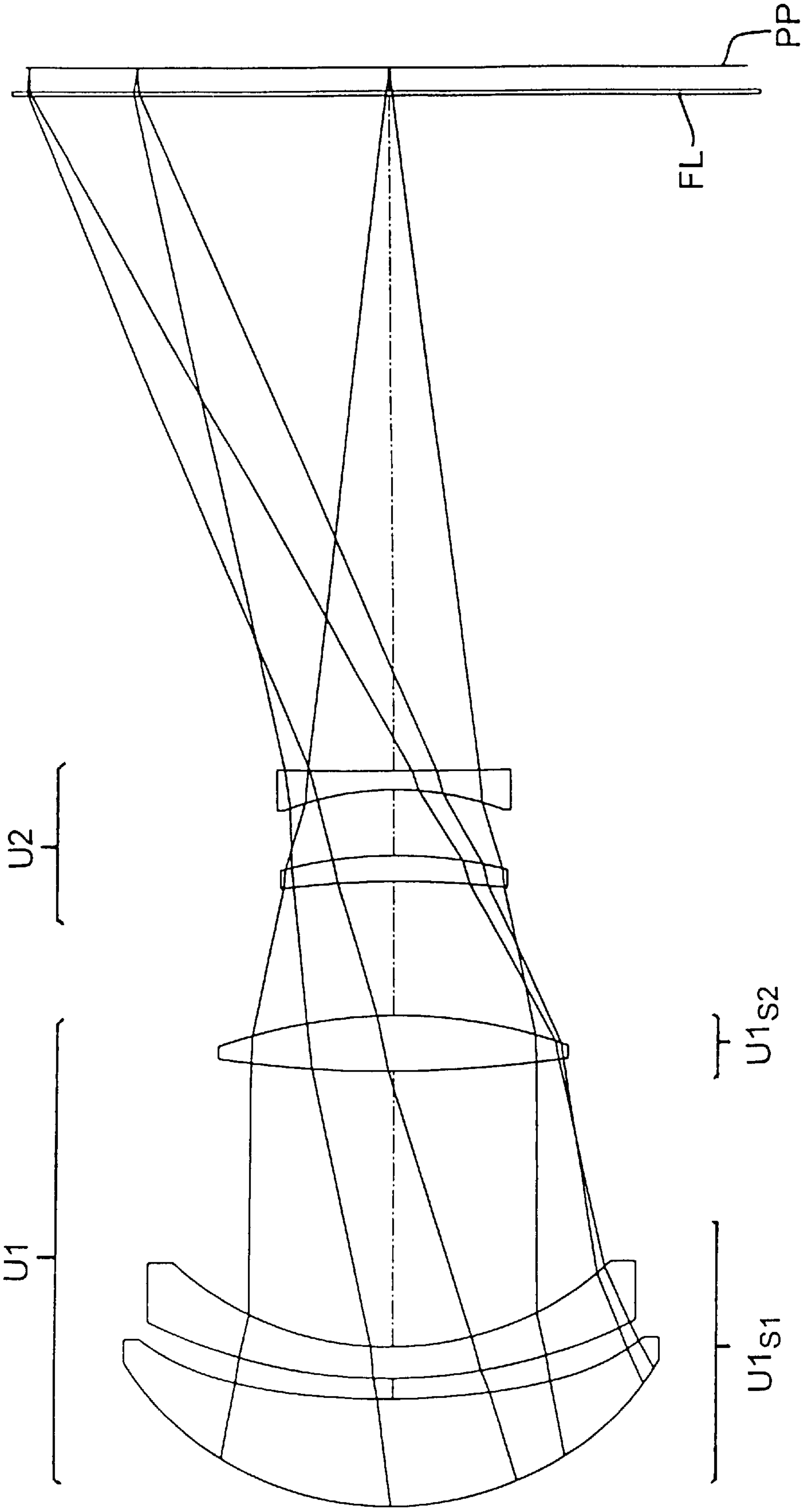
Figure 3:
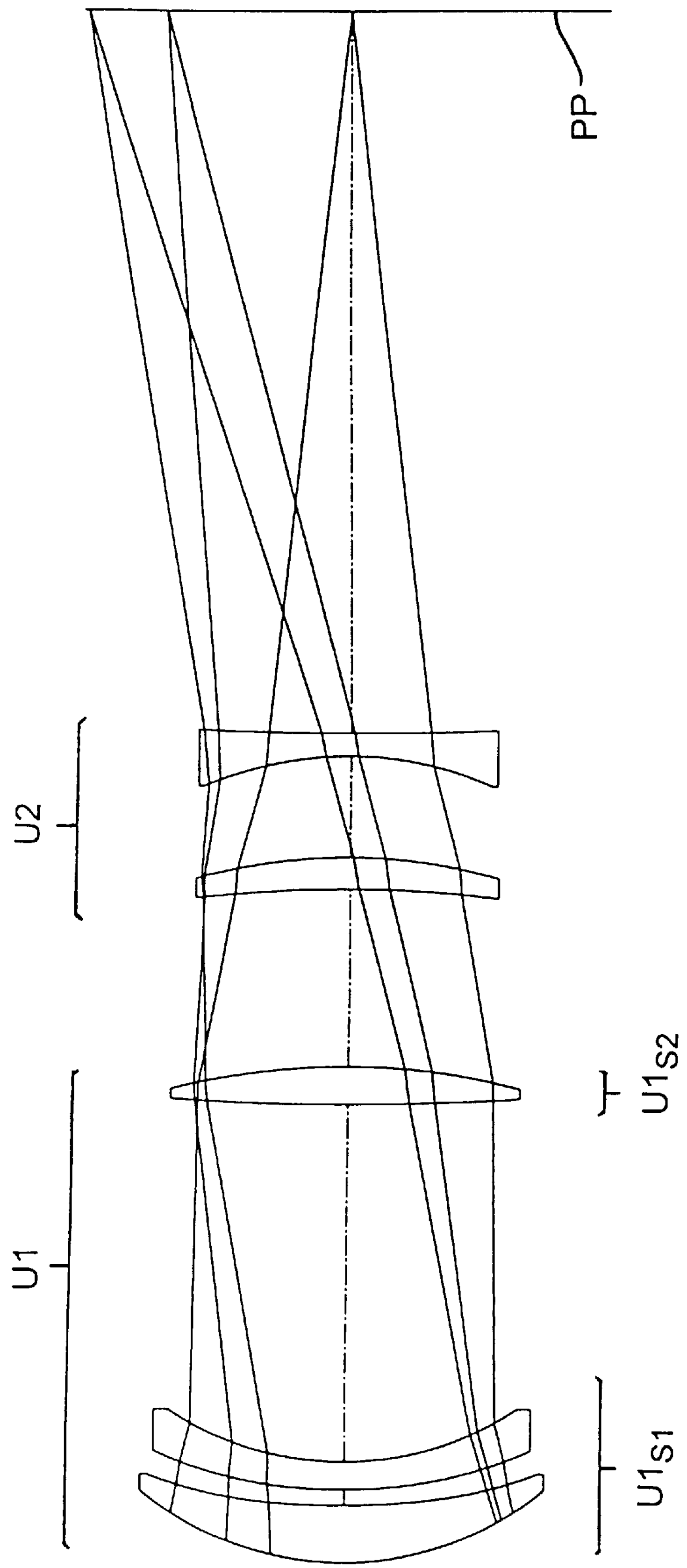
Figure 4:
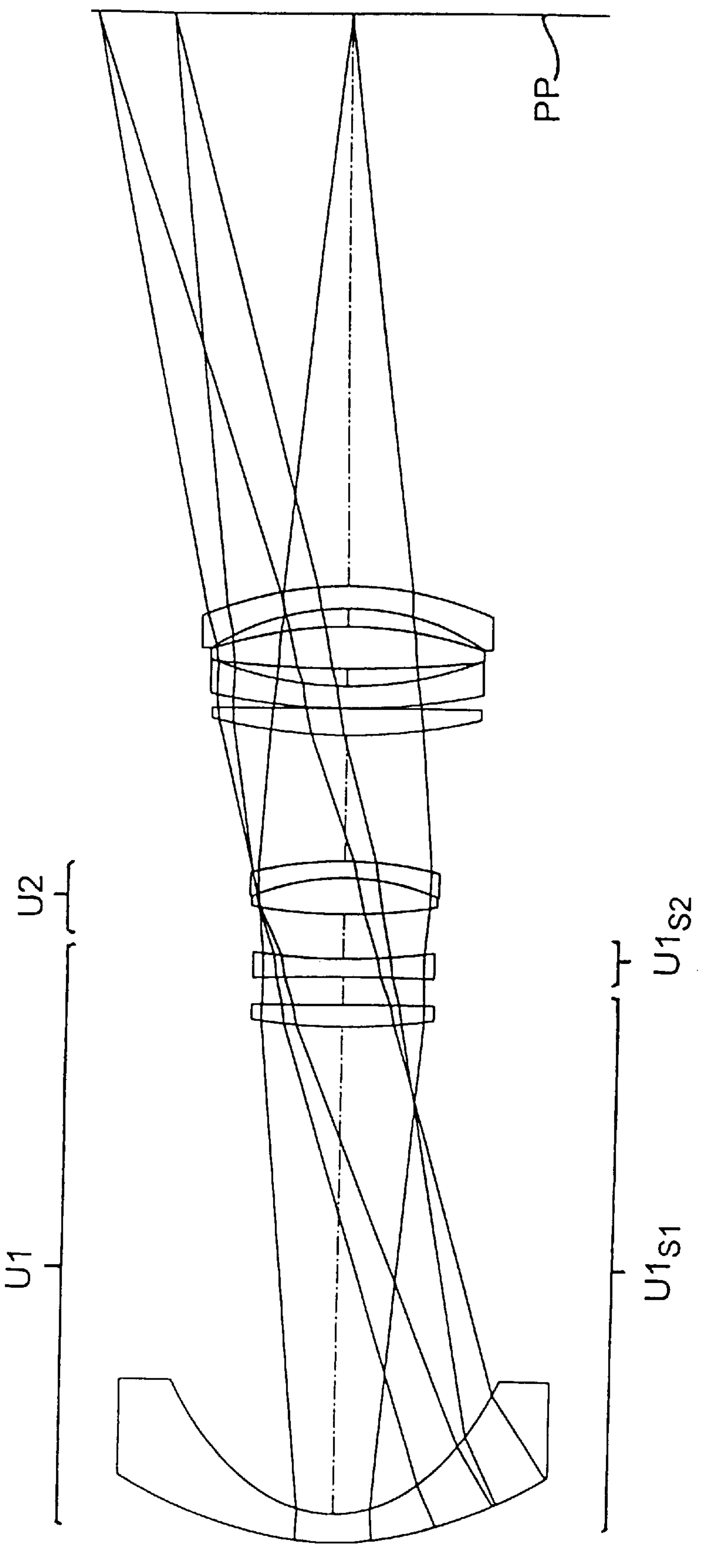
Figure 5:
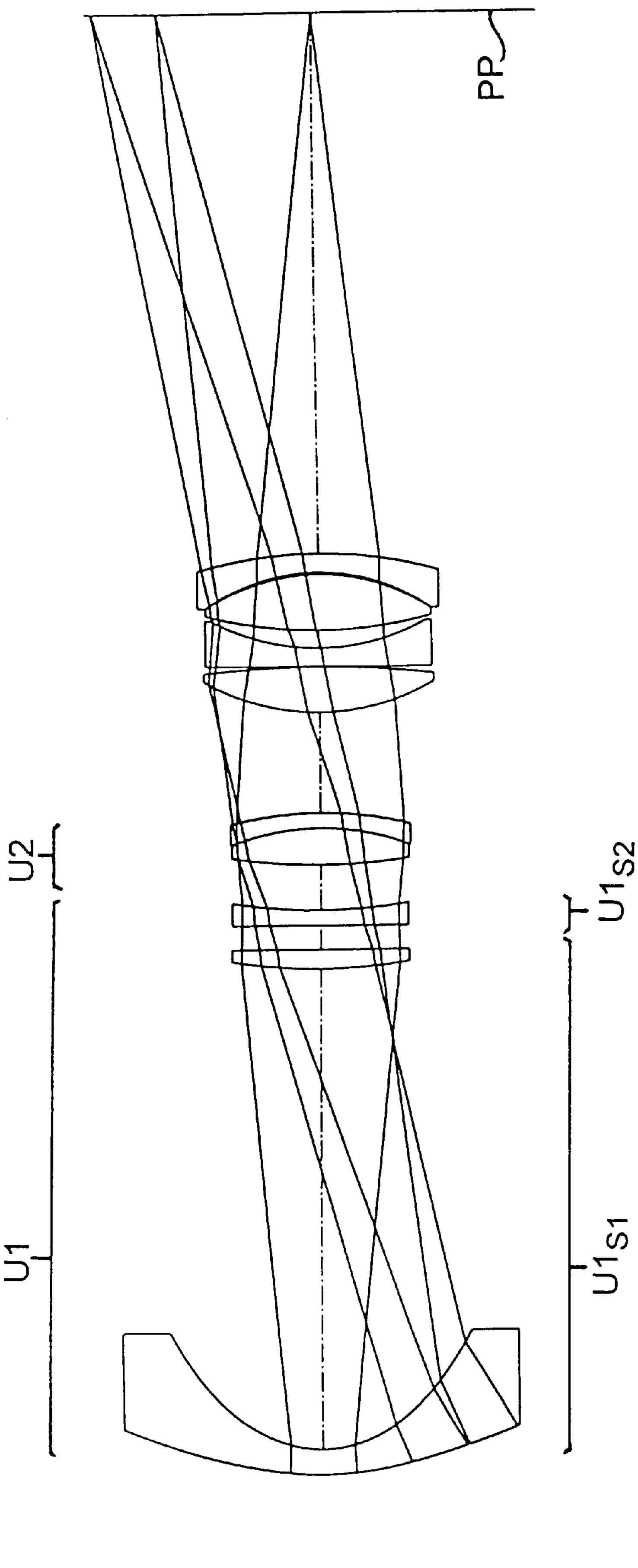
Figure 6:
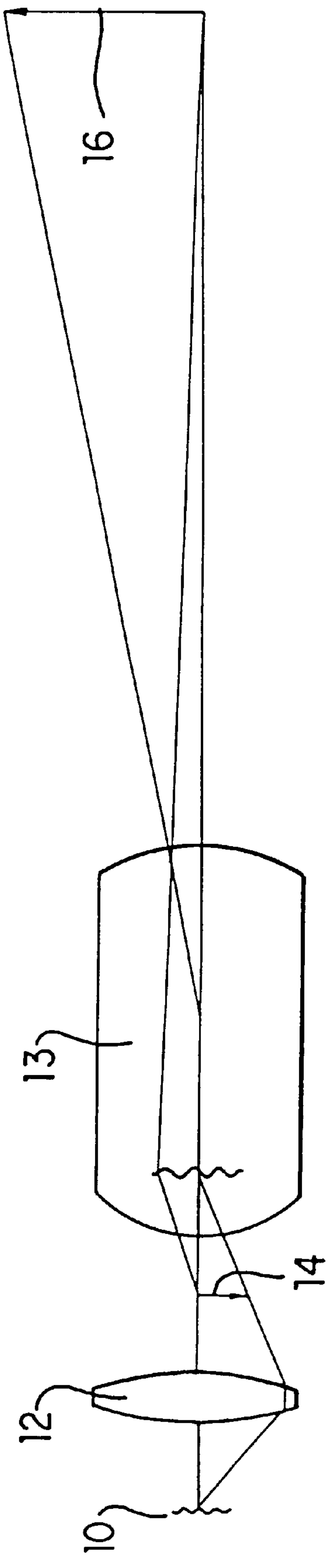
FIG. 6 is a schematic diagram showing an overall projection lens system in which the projection lenses of the present invention can be used.

FIGS. 1 to 5 illustrate various projection lenses constructed in accordance with the invention. Corresponding prescriptions and optical properties appear in Tables 1 to 5, respectively. HOYA or SCHOTT designations are used for the glasses employed in the lens systems. Equivalent glasses made by other manufacturers can be used in the practice of the invention. Industry acceptable materials are used for the plastic elements. Glass FCD1 used in the lens of Example 5 provides that lens with reduced color aberrations in comparison to the lens of Example 4.

The aspheric coefficients set forth in the tables are for use in the following equation:

$$z=\frac{cy^2}{1+[1-(1+k)c^2y^2]^{1/2}}+Dy^4+Ey^6+Fy^8+Gy^{10}+Hy^{12}+Iy^{14}$$

where z is the surface sag at a distance y from the optical axis of the system, c is the curvature of the lens at the optical axis, and k is a conic constant, which is zero except where indicated in the prescriptions of Tables 1–5.

The abbreviations used in the tables are as follows:

| | |
|---|---|
| EFL | effective focal length |
| FVD | front vertex distance |
| f/ | f-number |
| ENP | entrance pupil as seen from the long conjugate |
| BRL | barrel length |
| OBJ HT | object height |
| MAG | magnification |
| STOP | location and size of aperture stop |
| IMD | image distance |
| OBD | object distance |
| OVL | overall length. |

The values for these parameters reported in Tables 1–2 were calculated with the Fresnel lens as part of the system.

The designation "a" associated with various surfaces in the tables represents an aspheric surface, i.e., a surface for which at least one of D, E, F, G, H, or I in the above equation is not zero; the designation "c" indicates a surface for which k in the above equation is not zero; and the designation "f" indicates a Fresnel lens. Surface 1 in Table 1 and surface 7 in Table 3 are optional vignetting surfaces. All dimensions given in the tables are in millimeters.

The tables are constructed on the assumption that light travels from left to right in the figures. In actual practice, the viewing screen will be on the left and the pixelized panel will be on the right, and light will travel from right to left. In particular, the references in the tables to objects and images is reverse from that used in the rest of the specification and in the claims.

The pixelized panel is shown in the figures by the designation "PP" and the Fresnel lens associated with the pixelized panel where used is shown by the designation "FL". Fresnel lenses are employed in the systems of Examples 1–2 because these examples use large panels and a Fresnel lens helps to provide a near normal angle of incidence for the light from the illumination optics at the panel as is desired.

The correspondence between the various elements and surfaces of the lenses of Tables 1–5 and the "first lens unit", "first lens subunit", "second lens subunit", and "second lens unit" terminology discussed above is set forth in Table 6. In particular, U1 is the first lens unit, $U1_{S1}$ is the first lens subunit of the first lens unit, $U1_{S2}$ is the second lens subunit of the first lens unit, and U2 is the second lens unit.

Table 7 summarizes which of the positions in the Tables 1–5 illustrate focusing and which illustrate zooming.

As discussed above, the projection lenses of FIGS. 1–5 were designed using the pseudo-aperture stop/entrance pupil technique of Betensky, U.S. Pat. No. 5,313,330. In accordance with this approach, the illumination system is used to define the entrance pupil for the projection lens, with the entrance pupil being located at a constant position relative to the pixelized panel for all lens focal lengths and conjugates. The location of this pupil is determined by the substantially parallel light (substantially telecentric light) which passes through the pixelized panel from the illumination system and the Fresnel lens which is located at a fixed position on the projection lens side of the panel.

The surface labeled "aperture stop" in Tables 1–5 constitutes the pseudo-aperture stop of the above Betensky patent. Its location corresponds to the location of the output of the illumination system. As can be seen in the subtables labeled "Variable Spaces," the distance from the pseudo-aperture stop to the pixelized panel is essentially constant for all focus positions/zoom positions (magnifications) of the projection lens systems of FIGS. 1–5 (see the column labeled "Image Distance"). For the focus and zoom positions shown, the variable space which defines the location of the aperture stop relative to the back surface of the projection lens is negative corresponding to the illumination output being located within the space defined by the lens' front and back lens surfaces. It should be noted that although preferred, the pseudo-aperture stop approach does not have to be used in the design of the lenses of the invention. Rather, the lenses can be designed using a conventional aperture stop.

Table 8 summarizes various properties of the lenses of Tables 1–5. The numerical values of this table were calculated with the Fresnel lens as part of the overall system for Examples 1–2. As shown in this table, the lenses of the examples achieve a focus range of at least 0.05 and in many cases a focus range above 0.1, where the focus ranges given in this table are based on the preferred distortion, lateral color, and axial color criteria discussed above. That is, for the focus ranges set forth in the table, the lenses achieve distortions of less than 1% (see the column labeled "distortion") and color corrections of less than half a pixel and less than two pixels for lateral and axial color, respectively, for wavelengths between 470 nanometers and 630 nanometers.

As also shown in Table 8, the lenses have limited zoom ranges of less than 0.15 and in many cases less than 0.1, which allows them to have the relatively simple structures shown in the figures. The "limitation" column in this table shows the criterion which limits the zoom range. For example, for the lens of Example 1 if the zoom range were to be increased to 0.090, the distortion would exceed 1%, while for the lens of Example 3, if the zoom range were to be increased to 0.177, the color correction of the lens would drop below a half a pixel for lateral color and/or 2 pixels for axial color for wavelengths between 470 nanometers and 630 nanometers.

In summary, the lenses of the invention achieve all of the desired properties listed above for projection lenses for use with pixelized panels.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

| Surf. No. | Type | Radius | Thickness | Glass | Clear Aperture Diameter |
|---|---|---|---|---|---|
| 1 | | ∞ | 5.00000 | | 90.50 |
| 2 | | 83.1719 | 13.00000 | BACED5 | 91.00 |
| 3 | | 233.9264 | 13.33000 | | 89.11 |
| 4 | | −485.5457 | 6.47000 | FD2 | 85.22 |
| 5 | | 105.3363 | 25.75000 | | 81.16 |
| 6 | a | 154.1888 | 10.00000 | ACRYLIC | 83.92 |
| 7 | a | 174.3731 | 2.00000 | | 85.20 |
| 8 | | 284.2298 | 14.70000 | BACD5 | 87.00 |
| 9 | | −139.0179 | Space 1 | | 89.10 |
| 10 | a | −585.4332 | 11.69000 | ACRYLIC | 95.00 |
| 11 | | −164.0203 | 15.47000 | | 95.50 |
| 12 | a | −131.3993 | 7.79000 | ACRYLIC | 96.00 |
| 13 | a | 452.6431 | Space 2 | | 108.00 |
| 14 | | Aperture stop | 321.37000 | | 82.70 |
| 15 | | ∞ | 2.00000 | ACRYLIC | 304.00 |

TABLE 1-continued

| | | | | |
|---|---|---|---|---|
| 16 | acf | −145.1760 | Image distance | 304.00 |

Symbol Description a - Polynomial asphere
c - Conic section
f - Fresnel

Conics

| Surface Number | Constant |
|---|---|
| 16 | −1.0000E + 00 |

Even Polynomial Aspheres

| Surf. No. | D | E | F | G | H | |
|---|---|---|---|---|---|---|
| 6 | −7.0450E−07 | −1.4118E−11 | −4.6437E−14 | 2.0991E−17 | −8.3654E−21 | 1.8668E−24 |
| 7 | −5.8899E−07 | 1.3633E−12 | 5.5836E −14 | −8.2367E−17 | 3.4781E−20 | −4.8293E−24 |
| 10 | −4.2671E−08 | 2.3388E−10 | −1.2627E −13 | 6.6272E−17 | −2.3640E−20 | 3.6813E−24 |
| 12 | −5.3253E−07 | −1.0642E−10 | 3.9159E −14 | −9.0601E−18 | 6.1443E−21 | −1.7273E−24 |
| 13 | −4.8337E−07 | 1.0322E−10 | −3.0287E −14 | 1.7560E−17 | −4.5633E−21 | 3.8509E−25 |
| 16 | −2.9975E−09 | 1.1630E−14 | −2.8304E −20 | 0.0000E+00 | 0.0000E+00 | 0.9000E+00 |

Variable Spaces

| Pos. | Space 1 T(9) | Space 2 T(13) | Focal Shift | Image Distance |
|---|---|---|---|---|
| 1 | 5.227 | −69.256 | −1.432 | 9.957 |
| 2 | 5.227 | −92.613 | −0.642 | 9.990 |
| 3 | 5.227 | −52.312 | −1.787 | 9.935 |
| 4 | 14.700 | −116.470 | −1.285 | 9.997 |
| 5 | 0.777 | −80.140 | 0.265 | 9.993 |

SYSTEM FIRST ORDER PROPERTIES, POS 1

POS 1 System First Order Properties
OBJ. HT: −1360.0 f/ 3.93 MAG: −0.1100
STOP: 0.00 after surface 14. DIA: 82.432
EFL: 363.715 FVD: 394.498 ENP: 37.2564
IMD: 9.95692 BRL: 384.541
OBD: −3229.58 OVL: 3624.07

SYSTEM FIRST ORDER PROPERTIES, POS 2

OBJ. HT: −3750.0 f/ 3.93 MAG: −0.0400
STOP: 0.00 after surface 14. DIA: 82.572
EFL: 334.551 FVD: 371.174 ENP: 10.2225
IMD: 9.98978 BRL: 361.184
OBD: −8319.72 OVL: 8690.90

SYSTEM FIRST ORDER PROPERTIES, POS 3

OBJ. HT: −935.00 f/ 4.15 MAG: −0.1600
STOP: 0.00 after surface 14. DIA: 77.947
EFL: 388.269 FVD: 411.420 ENP: 59.6933
IMD: 9.93544 BRL: 401.484
OBD: −2322.07 OVL: 2733.49

SYSTEM FIRST ORDER PROPERTIES, POS 4

OBJ. HT: −3901.0 f/ 3.93 MAG: −0.0384
STOP: 0.00 after surface 14. DIA: 82.662
EFL: 320.597 FVD: 356.797 ENP: −9.34592
IMD: 9.99721 BRL: 346.800
OBD: −8331.49 OVL: 8688.29

SYSTEM FIRST ORDER PROPERTIES, POS 5

OBJ. HT: −3672.0 f/ 3.93 MAG: −0.0409
STOP: 0.00 after surface 14. DIA: 82.524
EFL: 342.287 FVD: 379.200 ENP: 21.0808
IMD: 9.99287 BRL: 369.207
OBD: −8312.39 OVL: 8691.59

TABLE 1-continued

First Order Properties of Elements

| Element Number | Surface Numbers | | Power | f |
|---|---|---|---|---|
| 1 | 2 | 3 | 0.53017E−02 | 188.62 |
| 2 | 4 | 5 | −0.75677E−02 | −132.14 |
| 3 | 6 | 7 | 0.43140E−03 | 2318.0 |
| 4 | 8 | 9 | 0.62533E−02 | 159.92 |
| 5 | 10 | 11 | 0.21869E−02 | 457.27 |
| 6 | 12 | 13 | −0.48701E−02 | −205.34 |
| 7 | 15 | 16 | 0.34012E−02 | 294.01 |

First Order Properties of Groups

| Group Number | Surface Numbers | | Power | f |
|---|---|---|---|---|
| 1 | 1 | 9 | 0.46991E−02 | 212.81 |
| 2 | 10 | 13 | −0.25381E−02 | −393.99 |
| 3 | 14 | 16 | 0.34012E−02 | 294.01 |

TABLE 2

| Surf. No. | Type | Radius | Thickness | Glass | Clear Aperture Diameter |
|---|---|---|---|---|---|
| 1 | a | 134.9605 | 45.00000 | ACRYLIC | 220.00 |
| 2 | a | 348.1941 | 8.62976 | | 207.00 |
| 3 | | 230.1574 | 13.00000 | FD60 | 200.00 |
| 4 | | 136.5336 | Space 1 | | 179.00 |
| 5 | | 521.2834 | 23.00000 | FC5 | 142.12 |
| 6 | | −217.2857 | Space 2 | | 140.40 |
| 7 | | −401.1839 | 11.00000 | FEL6 | 93.16 |
| 8 | | −185.1807 | 27.79300 | | 93.12 |
| 9 | a | −128.3218 − | 8.00000 | ACRYLIC | 90.00 |
| 10 | | 2115.1861 | Space 3 | | 96.00 |
| 11 | | Aperture stop | 321.37000 | | 81.12 |
| 12 | | ∞ | 2.00000 | ACRYLIC | 308.00 |
| 13 | acf | −145.1760 | Image distance | | 308.00 |

Symbol Description a - Polynomial asphere
c - Conic section
f - Fresnel

Conics

| Surface Number | Constant |
|---|---|
| 13 | −1.0000E + 00 |

Even Polynomial Aspheres

| Surf. No. | D | E | F | G | H | |
|---|---|---|---|---|---|---|
| 1 | −1.5457E−08 | 3.0560E−12 | −3.7466E−16 | 1.1699E−20 | 2.0202E−24 | −1.0151E−28 |
| 2 | 2.4531E−08 | 9.8359E−12 | −1.9790E−15 | 2.6450E−19 | −1.5527E−23 | 3.4627E−28 |
| 9 | 4.3896E−08 | −6.3309E−11 | 9.1509E−14 | −6.5759E−17 | 2.3749E−20 | −3.3880E−24 |
| 13 | −2.9975E−09 | 1.1630E−14 | −2.8304E−20 | 0.0000E+00 | 0.0000E+00 | 0.0000E+00 |

Variable Spaces

| Pos. | Space 1 T(4) | Space 2 T(6) | Space 3 T(10) | Focal Shift | Image Distance |
|---|---|---|---|---|---|
| 1 | 115.081 | 56.378 | −37.017 | −0.495 | 9.999 |
| 2 | 111.879 | 56.378 | −74.519 | −0.228 | 9.992 |
| 3 | 116.995 | 56.378 | −9.880 | −0.404 | 9.995 |
| 4 | 115.081 | 46.000 | −4.750 | 1.000 | 10.009 |
| 5 | 115.081 | 75.000 | −88.000 | −2.000 | 10.093 |

TABLE 2-continued

SYSTEM FIRST ORDER PROPERTIES, POS 1

| | | | | | |
|---|---|---|---|---|---|
| OBJ. HT: −1350.0 | f/ | 4.00 MAG: | −0.1100 | | |
| STOP: 0.00 after surface 11. DIA: 80.981 | | | | | |
| EFL: 627.485 | FVD: | 604.234 | ENP: | 386.760 | |
| IMD: 9.99915 | BRL: | 594.235 | | | |
| OBD: −5200.63 | OVL: | 5804.87 | | | |

SYSTEM FIRST ORDER PROPERTIES, POS 2

| | | | | | |
|---|---|---|---|---|---|
| OBJ. HT: −3710.0 | f/ | 4.00 MAG: | −0.0400 | | |
| STOP: 0.00 after surface 11. DIA: 81.007 | | | | | |
| EFL: 542.999 | FVD: | 563.523 | ENP: | 260.814 | |
| IMD: 9.99177 | BRL: | 553.531 | | | |
| OBD: −13225.3 | OVL: | 13788.8 | | | |

SYSTEM FIRST ORDER PROPERTIES, POS 3

| | | | | | |
|---|---|---|---|---|---|
| OBJ. HT: −925.00 | f/ | 4.30 MAG: | −0.1600 | | |
| STOP: 0.00 after surface 11. DIA: 75.241 | | | | | |
| EFL: 706.650 | FVD: | 633.281 | ENP: | 500.675 | |
| JMD: 9.99470 | BRL: | 623.286 | | | |
| OBD: −3769.40 | OVL: | 4402.68 | | | |

SYSTEM FIRST ORDER PROPERTIES, POS 4

| | | | | | |
|---|---|---|---|---|---|
| OBJ. HT: −1291.0 | f/ | 4.40 MAG: | −0.1157 | | |
| STOP: 0.00 after surface 11. DIA: 73.704 | | | | | |
| EFL: 670.653 | FVD: | 626.134 | ENP: | 477.592 | |
| IMD: J0.0094 | BRL: | 616.124 | | | |
| OBD: −51#5.62 | OVL: | 5811.75 | | | |

SYSTEM FIRST ORDER PROPERTIES, POS 5

POS 5 System First Order Properties

| | | | | | |
|---|---|---|---|---|---|
| OBJ. HT: −1471.0 | f/ | 4.10 MAG: | −0.1010 | | |
| STOP: 0.00 after surface 11. DIA: 78.860 | | | | | |
| EFL: 565.174 | FVD: | 571.968 | ENP: | 260.515 | |
| IMD: J0.0934 | BRL: | 561.874 | | | |
| OBD: −5239.96 | OVL: | 5811.92 | | | |

First Order Properties of Elements

| Element Number | Surface Numbers | | Power | f |
|---|---|---|---|---|
| 1 | 1 | 2 | 0.23969E−02 | 417.21 |
| 2 | 3 | 4 | −0.22704E−02 | −440.45 |
| 3 | 5 | 6 | 0.31569E−02 | 316.77 |
| 4 | 7 | 8 | 0.15811E−02 | 632.49 |
| 5 | 9 | 10 | −0.40862E−02 | −244.73 |
| 6 | 12 | 13 | 0.34012E−02 | 294.01 |

First Order Properties of Groups

| Group Number | Surface Numbers | | Power | f |
|---|---|---|---|---|
| 1 | 1 | 4 | 0.52599E−03 | 1901.2 |
| 2 | 5 | 6 | 0.31569E−02 | 316.77 |
| 3 | 7 | 10 | −0.23626E−02 | −423.26 |
| 4 | 11 | 13 | 0.34012E−02 | 294.01 |

TABLE 3

| Surf. No. | Type | Radius | Thickness | Glass | Clear Aperture Diameter |
|---|---|---|---|---|---|
| 1 | a | 123.4725 | 23.00000 | ACRYLIC | 155.96 |
| 2 | a | 268.9281 | 6.37000 | | 150.96 |
| 3 | | 185.7020 | 11.00000 | ED60 | 145.51 |
| 4 | | 122.5292 | Space 1 | | 134.15 |
| 5 | | 999.8936 | 15.00000 | BACD5 | 133.87 |
| 6 | | −280.9443 | Space 2 | | 133.97 |
| 7 | | ∞ | 15.00000 | | 114.00 |
| 8 | | −465.4986 | 13.00000 | BACD14 | 114.55 |
| 9 | | −215.1220 | 41.33000 | | 115.63 |
| 10 | a | −133.5451 | 9.00000 | ACRYLIC | 110.38 |
| 11 | a | 1999.9999 | Space 3 | | 114.18 |
| 12 | Aperture stop | Image distance | | 112.94 | |

TABLE 3-continued

Symbol Description a - Polynomial asphere
Even Polynomial Aspheres

| Surf. No. | D | E | F | G | H | |
|---|---|---|---|---|---|---|
| 1 | −7.2724E−09 | 2.0437E−12 | −4.3841E−16 | 2.1119E−20 | 2.7645E−24 | 4.6551E−3 |
| 2 | 2.5764E−08 | 4.6251E−12 | −1.0544E−15 | 1.3024E−19 | −3.7725E−24 | 3.5026E−2 |
| 10 | 1.0147E−07 | −2.0828E−11 | 8.7030E−15 | −3.5103E−18 | 8.7106E−22 | −8.5534E−2 |
| 11 | 6.4862E−08 | −1.5431E−11 | 1.0319E−15 | 6.3748E−19 | −1.9275E−22 | 1.7923E−2 |

Variable Spaces

| Pos. | Space 1 T(4) | Space 2 T(6) | Space 3 T(10) | Focal Shift | Image Distance |
|---|---|---|---|---|---|
| 1 | 140.587 | 55.451 | −216.496 | −0.221 | 504.021 |
| 2 | 143.373 | 55.451 | −176.092 | −0.469 | 503.946 |
| 3 | 145.620 | 55.451 | −147.183 | −0.508 | 504.023 |
| 4 | 143.373 | 40.929 | −132.000 | 0.013 | 503.993 |
| 5 | 143.373 | 70.036 | −215.740 | −0.817 | 504.019 |

SYSTEM FIRST ORDER PROPERTIES, POS 1

OBJ. HT: −2550.0 f/ 4.50 MAG: −0.0400
STOP: 0.00 after surface 12. DIA: 112.78
EFL: 581.441 FVD: 617.263 ENP: −5.08552
IMD: 504.021 BRL: 113.242
OBD: −15244.0 OVL: 15861.3

SYSTEM FIRST ORDER PROPERTIES, POS 2

OBJ. HT: −940.00 f/ 4.50 MAG: −0.1100
STOP: 0.00 after surface 12. DIA: 112.82
EFL: 582.019 FVD: 660.378 ENP: 63.0101
IMD: 503.946 BRL: 156.432
OBD: −5997.26 OVL: 6657.64

SYSTEM FIRST ORDER PROPERTIES, POS 3

OBJ. HT: −635.00 f/ 4.70 MAG: −0.1600
STOP: 0.00 after surface 12. DIA: 107.99
EFL: 582.486 FVD: 691.611 ENP: 120.116
JMD: 504.023 BRL: 187.588
OBD: −4345.28 OVL: 5036.89

SYSTEM FIRST ORDER PROPERTIES, POS 4

OBJ. HT: −872.00 f/ 4.65 MAG: −0.1169
STOP: 0.00 after surface 12. DIA: 109.02
EFL: 612.010 FVD: 689.99.5 ENP: 135.082
IMD: 503.993 BRL: 186.002
OBD: −5966.40 OVL: 6656.40

SYSTEM FIRST ORDER PROPERTIES, POS 5

OBJ HT: −982.00 f/ 4.50 MAG: −0.1040
STOP: 0.00 after surface 12. DIA: 112.93
EFL 554.718 FVD: 635.388 ENP: 4.64639
IMD 504.019 BRL: 131.369
OBD: −6017.35 OVL: 6652.73

First Order Properties of Elements

| Element Number | Surface Numbers | | Power | f |
|---|---|---|---|---|
| 1 | 1 | 2 | 0.22760E−02 | 439.36 |
| 2 | 3 | 4 | −0.20800E−02 | −480.77 |
| 3 | 5 | 6 | 0.26849E−02 | 372.46 |
| 4 | 8 | 9 | 0.15435E−02 | 647.86 |
| 5 | 10 | 11 | −0.39498E−02 | −253.18 |

First Order Properties of Groups

| Group Number | Surface Numbers | | Power | f |
|---|---|---|---|---|
| 1 | 1 | 4 | 0.44587E−03 | 2242.8 |
| 2 | 5 | 6 | 0.26849E−02 | 372.46 |
| 3 | 7 | 11 | −0.21936E−02 | −455.87 |

TABLE 4

| Surf. No. | Type | Radius | Thickness | Glass | Clear Aperture Diameter |
|---|---|---|---|---|---|
| 1 | a | 117.8894 | 12.00000 | ACRYLIC | 175.00 |
| 2 | ac | 49.7129 | 196.66640 | | 130.00 |
| 3 | | 243.8700 | 9.00000 | FD6 | 72.55 |
| 4 | | ∞ | Space 1 | | 72.40 |
| 5 | | −1257.8370 | 7.00000 | NBFD10 | 71.92 |
| 6 | | 276.8531 | Space 2 | | 71.94 |
| 7 | | 224.4526 | 15.00000 | FC5 | 73.09 |
| 8 | | −95.9987 | 7.00000 | F8 | 73.60 |
| 9 | | −156.4273 | Space 3 | | 75.17 |
| 10 | | 223.8968 | 11.00000 | FC5 | 105.38 |
| 11 | | ∞ | 0.30000 | | 105.97 |
| 12 | | 268.1102 | 9.00000 | FD6 | 107.04 |
| 13 | | 147.0862 | 7.30000 | | 105.95 |
| 14 | | 503.3765 | 16.50000 | FC5 | 106.07 |
| 15 | | −175.6372 | 7.36000 | | 107.49 |
| 16 | | −105.1167 | 9.00000 | FD6 | 107.58 |
| 17 | | −149.8025 | Space 4 | | 114.55 |
| 18 | | Aperture stop | Image distance | | 115.29 |

Symbol Description a - Polynomial asphere
c - Conic section

Conics

| Surface Number | Constant |
|---|---|
| 2 | −6.0000E − 01 |

Even Polynomial Aspheres

| Surf. No. | D | E | F | G | H | |
|---|---|---|---|---|---|---|
| 1 | −3.0550E − 07 | 2.9273E − 11 | −6.7828E − 16 | −4.5421E − 19 | 5.1109E − 23 | −1.8247E − 2 |
| 2 | −2.4894E − 07 | 1.5645E − 11 | −1.2814E − 14 | 9.9261E − 18 | −2.5832E − 21 | 1.9012E − 2 |

Variable Spaces

| Pos. | Space 1 T(4) | Space 2 T(6) | Space 3 T(9) | Space 4 T(17) | Focal Shift | Image Distance |
|---|---|---|---|---|---|---|
| 1 | 11.240 | 17.400 | 53.580 | −269.580 | −0.569 | 503.994 |
| 2 | 11.240 | 10.270 | 60.756 | −265.987 | −0.402 | 503.994 |
| 3 | 11.240 | 3.000 | 67.976 | −261.753 | −0.100 | 503.994 |
| 4 | 7.775 | 10.270 | 60.756 | −257.944 | −0.442 | 503.994 |
| 5 | 12.771 | 10.270 | 60.756 | −269.299 | −0.4i5 | 503.994 |

SYSTEM FIRST ORDER PROPERTIES, POS 1

OBJ. HT: −3095.0 f/ 4.50 MAG: −0.0335
STOP: 0.00 after surface 18. DIA: 112.89
EFL: 142.786 FVD: 623.761 ENP: 100.479
IMD: 503.994 BRL: 119.767
OBD: −4205.14 OVL: 4828.90

SYSTEM FIRST ORDER PROPERTIES, POS 2

OBJ. HT: −2935.0 f/ 4.50 MAG: −0.0350
STOP: 0.00 after surface 18. DIA: 112.84
EFL: 148.995 FVD: 627.297 ENP: 99.4580
IMD: 503.892 BRL: 123.405
OBD: −4202.03 OVL: 4829.32

SYSTEM FIRST ORDER PROPERTIES, POS 3

OBJ. HT: −2780.0 f/ 4.54 MAG: −0.0367
STOP: 0.00 after surface 18. DIA: 111.79
EFL: 155.789 FVD: 631.591 ENP: 98.5263
IMD: 504.002 BRL: 127.590
OBD: −4197.42 OVL: 4829.01

SYSTEM FIRST ORDER PROPERTIES; POS 4

OBJ. HT: −1135.0 f/ 4.60 MAG: −0.0900
STOP: 0.00 after surface 18. DIA: 110.39
EFL: 148.702 FVD: 632.101 ENP: 99.3860

TABLE 4-continued

IMD: 504.119 BRL: 127.983
OBD: −1597.88 OVL: 2229.98
SYSTEM FIRST.ORDER PROPERTIES, POS 5

OBJ. HT: −7300.0 f/ 4.50 MAG: −0.0140
STOP: 0.00 after surface 18. DIA: 112.88
EFL: 149.125 FVD: 625.625 ENP: 99.5175
IMD: 504.001 BRL: 121.623
OBD: −10596.5 OVL: 11222.2

First Order Properties of Elements

| Element Number | Surface Numbers | | Power | f |
|---|---|---|---|---|
| 1 | 1 | 2 | −0.54099E−02 | −184.85 |
| 2 | 3 | 4 | 0.33323E−02 | 300.10 |
| 3 | 5 | 6 | −0.37065E−02 | −269.79 |
| 4 | 7 | 8 | 0.71627E−02 | 139.61 |
| 5 | 8 | 9 | −0.23062E−02 | −433.61 |
| 6 | 10 | 11 | 0.21847E−02 | 457.73 |
| 7 | 12 | 13 | −0.24108E−02 | −414.80 |
| 8 | 14 | 15 | 0.37267E−02 | 268.33 |
| 9 | 16 | 17 | −0.20979E−02 | −476.68 |

First Order Properties of Doublets

| Element Number | | Surface Numbers | | Power | f |
|---|---|---|---|---|---|
| 4 | 5 | 7 | 9 | 0.47870E − 02 | 208.90 |

First Order Properties of Groups

| Group Number | Surface Numbers | | Power | f |
|---|---|---|---|---|
| 1 | 1 | 4 | 0.13556E−02 | 737.68 |
| 2 | 5 | 6 | −0.37065E−02 | −269.79 |
| 3 | 7 | 9 | 0.47870E−02 | 208.90 |
| 4 | 10 | 17 | 0.14185E−02 | 704.99 |

TABLE 5

| Surf. No. | Type | Radius | Thickness | Glass | Clear Aperture Diameter |
|---|---|---|---|---|---|
| 1 | a | 139.1783 | 12.00000 | ACRYLIC | 185.00 |
| 2 | ac | 51.2880 | 224.88409 | | 137.00 |
| 3 | | 246.8481 | 9.00000 | FD6 | 81.55 |
| 4 | | ∞ | Space 1 | | 81.37 |
| 5 | | ∞ | 7.00000 | NBFD10 | 80.68 |
| 6 | | 252.9223 | Space 2 | | 80.35 |
| 7 | | 273.0633 | 17.00000 | FC5 | 80.94 |
| 8 | | −114.4438 | 7.00000 | F2 | 81.22 |
| 9 | | −179.9972 | Space 3 | | 82.21 |
| 10 | | 103.7400 | 22.00000 | FC5 | 103.64 |
| 11 | | −483.1217 | 0.30000 | | 102.98 |
| 12 | | ∞ | 9.00000 | NBFD11 | 102.09 |
| 13 | | 102.3704 | 8.60000 | | 98.68 |
| 14 | | 199.2325 | 26.50000 | FCDI | 100.28 |
| 15 | | −95.2652 | 1.20000 | | 101.61 |
| 16 | | −90.2695 | 8.50000 | NBFD11 | 101.55 |
| 17 | | −207.3439 | Space 4 | | 108.97 |
| 18 | | Aperture stop | Image distance | | 115.12 |

Symbol Description a - Polynomial asphere
c - Conic section

Conics

| Surface Number | Constant |
|---|---|
| 2 | −6.0000E − 01 |

TABLE 5-continued

Even Polynomial Aspheres

| Surf. No. | D | E | F | G | H | |
|---|---|---|---|---|---|---|
| 1 | −3.2280E − 07 | 3.3804E − 11 | −6.7708E − 16 | −4.3472E − 19 | 4.8435E − 23 | −1.5927E − 27 |
| 2 | −3.1725E − 07 | 5.6735E − 12 | −1.3489E − 14 | 1.0145E − 17 | −2.6514E − 21 | 2.0405E − 25 |

Variable Spaces

| Pos. | Space 1 T(4) | Space 2 T(6) | Space 3 T(9) | Space 4 T(17) | Focal Shift | Image Distance |
|---|---|---|---|---|---|---|
| 1 | 11.518 | 20.760 | 48.230 | −249.990 | −0.573 | 504.035 |
| 2 | 11.518 | 11.522 | 57.514 | −245.654 | −0.382 | 504.035 |
| 3 | 11.5i8 | 3.000 | 65.983 | −241.090 | −0.100 | 504.035 |
| 4 | 7.775 | 11.522 | 57.514 | −237.388 | −0.392 | 504.035 |
| 5 | 13.252 | 11.522 | 57.514 | −249.i13 | −0.442 | 504.035 |

SYSTEM FIRST ORDER PROPERTIES, POS 1

| | | | | | |
|---|---|---|---|---|---|
| OBJ. HT: | −3110.0 | f/ | 4.50 MAG: | −0.0333 | |
| STOP: | 0.00 after surface 18. DIA: 112.95 | | | | |
| EFL: | 142.220 | FVD: | 687.538 | ENP: | 103.574 |
| IMD: | 504.035 | BRL: | 183.503 | | |
| OBD: | −4205.20 | OVL: | 4892.73 | | |

SYSTEM FIRST ORDER PROPERTIES, POS 2

| | | | | | |
|---|---|---|---|---|---|
| OBJ. HT: | −2935.0 | f/ | 4.50 MAG: | −0.0350 | |
| STOP: | 0.00 after surface 18. DIA: 112.89 | | | | |
| EFL: | 149.045 | FVD: | 691.766 | ENP: | 102.743 |
| IMD: | 503.882 | BRL: | 187.884 | | |
| OBD: | −4200.19 | OVL: | 4891.95 | | |

SYSTEM FIRST ORDER PROPERTIES, POS 3

| | | | | | |
|---|---|---|---|---|---|
| OBJ HT: | −2782.0 | f/ | 4.54 MAG: | −0.0367 | |
| STOP: | 0.00 after surface 18. DIA: 111.85 | | | | |
| EFL | 155.824 | FVD: | 696.383 | ENP: | 102.110 |
| IMD | 503.988 | BRL: | 192.395 | | |
| OBD | −4195.98 | OVL: | 4892.36 | | |

SYSTEM FIRST ORDER PROPERTIES, POS 4

| | | | | | |
|---|---|---|---|---|---|
| OBJ. HT: | −1135.0 | f/ | 4.60 MAG: | −0.0900 | |
| STOP: | 0.00 after surface 18. DIA: 110.42 | | | | |
| EFL: | 148.714 | FVD: | 696.417 | ENP: | 102.808 |
| IMD: | 504.011 | BRL: | 192.406 | | |
| OBD: | −1594.60 | OVL: | 2291.02 | | |

SYSTEM FIRST ORDER PROPERTIES, POS 5

| | | | | | |
|---|---|---|---|---|---|
| OBJ HT: | −7300.0 | f/ | 4.50 MAG: | −0.0140 | |
| STOP: | 0.00 after surface 18. DIA: 112.95 | | | | |
| EFL | 149.198 | FVD: | 690.202 | ENP: | 102.752 |
| IMD | 504.042 | BRL: | 186.159 | | |
| OBD | −10598.6 | OVL: | 11288.8 | | |

First Order Properties of Elements

| Element Number | Surface Numbers | | Power | f |
|---|---|---|---|---|
| 1 | 1 | 2 | −0.58053E−02 | −172.26 |
| 2 | 3 | 4 | 0.32921E−02 | 303.76 |
| 3 | 5 | 6 | −0.33184E−02 | −301.35 |
| 4 | 7 | 8 | 0.59780E−02 | 167.28 |
| 5 | 8 | 9 | −0.19045E−02 | −525.07 |
| 6 | 10 | 11 | 0.56570E−02 | 176.77 |
| 7 | 12 | 13 | −0.77185E−02 | −129.56 |
| 8 | 14 | 15 | 0.75026E−02 | 133.29 |
| 9 | 16 | 17 | −0.47840E−02 | −209.03 |

First Order Properties of Doublets

| Element Number | | Surface Numbers | | Power | f |
|---|---|---|---|---|---|
| 4 | 5 | 7 | 9 | 0.40231E − 02 | 248.57 |

TABLE 5-continued

First Order Properties of Groups

| Group Number | Surface Numbers | | Power | f |
|---|---|---|---|---|
| 1 | 1 | 4 | 0.16908E−02 | 591.44 |
| 2 | 5 | 6 | −0.33184E−02 | −301.35 |
| 3 | 7 | 9 | 0.40231E−02 | 248.57 |
| 4 | 10 | 17 | 0.13194E−02 | 757.92 |

TABLE 6

| Example | U1 | U1$_{S1}$ | U1$_{S2}$ | U2 |
|---|---|---|---|---|
| 1 | S2–S9 | — | — | S10–S13 |
| 2 | S1–S6 | S1–S4 | S5–S6 | S7–S10 |
| 3 | S1–S6 | S1–S4 | S5–S6 | S8–S11 |
| 4 | S1–S6 | S1–S4 | S5–S6 | S7–S9 |
| 5 | S1–S6 | S1–S4 | S5–S6 | S7–S9 |

TABLE 7

| Example | Focus Positions | Zoom Positions |
|---|---|---|
| 1 | 1,2,3 | 2,4,5 |
| 2 | 1,2,3 | 1,4,5 |
| 3 | 1,2,3 | 2,4,5 |
| 4 | 2,4,5 | 1,2,3 |
| 5 | 2,4,5 | 1,2,3 |

TABLE 8

| Example | Panel Size (mm) | Pixel Size (mm) | Focus Range[1] | Zoom Range[2] (%) | Limitation[3] | Distortion (d) (%) |
|---|---|---|---|---|---|---|
| 1 | 203 × 152 | 0.2 | 0.12 | 0.060 | Distortion | −0.5 < d < 0.25 |
| 2 | 203 × 152 | 0.2 | 0.12 | 0.132 | Distortion | −0.25 < d < 0.25 |
| 3 | 118 × 88 | 0.09 | 0.12 | 0.118 | Color[4] | 0 < d < 0.1 |
| 4 | 118 × 88 | 0.09 | 0.08 | 0.108 | Distortion | −1 < d < 0.5 |
| 5 | 118 × 88 | 0.09 | 0.08 | 0.112 | Distortion | −1 < d < 0.4 |

[1]Defined as the difference between the absolute values of the conjugate magnification range
[2]Defined as the zoom range for which the image quality, including distortion, is satisfactory
[3]The image quality component that limits the available zoom range.
[4]Acceptable values of lateral color and axial color blur are 0.5 pixels and 2 pixels respectively.

What is claimed is:

1. A variable focus, mini-zoom projection lens for forming a magnified image of an object, said object having a height $h_O$ and said magnified image having a height $h_I$, where $|h_I|>|h_O|$,
said projection lens comprising:
(A) a first lens unit at the image end of the projection lens, said first lens unit comprising at least one lens element, the image end of said first lens unit being separated from the object by an axial distance D; and
(B) a second lens unit for zooming located between the first lens unit and the object, said second lens unit comprising at least one lens element, the image end of said second lens unit being separated from the object end of said first lens unit by an axial distance $D_{12}$;

wherein:
(i) the object comprises a panel composed of pixels;
(ii) focusing of the projection lens comprises varying the axial distance D;
(iii) zooming of the projection lens comprises varying the axial distance $D_{12}$;
(iv) the projection lens has a focus range F of at least 0.05, where F is defined by the formula:

$$F=\max|h_O/h_I|-\min|h_O/h_I|,$$

where max $|h_O/h_I|$ and min $|h_O/h_I|$ are the maximum and minimum magnitudes, respectively, of the image-to-object magnification of the projection lens; and
(v) the projection lens has a zoom range Z whose maximum value $Z_{MAX}$ over the focus range is less than 0.15, where the zoom range Z is defined by the formula:

$$Z=2*(\max|h_I|-\min|h_I|)/(\max|h_I|+\min|h_I|),$$

where max $|h_I|$ and min $|h_I|$ are the maximum and minimum magnitudes, respectively, of the image height as a result of zooming about a $|h_O/h_I|$ ratio in the focus range.

2. The variable focus, mini-zoom projection lens of claim 1 wherein:

$$35*h_O|>|h_I|>3*|h_O|.$$

3. The variable focus, mini-zoom projection lens of claim 1 wherein zooming of the projection lens further comprises refocusing of the projection lens, said refocusing comprising varying the axial distance D.

4. The variable focus, mini-zoom projection lens of claim 1 wherein the second lens unit comprises two lens elements, one having a positive power and the other a negative power.

5. The variable focus, mini-zoom projection lens of claim 1 wherein:
the first lens unit comprises a first lens subunit and a second lens subunit, said subunits being separated from one another by an axial space, each of said subunits comprising at least one lens element; and
focusing of the projection lens further comprises varying the axial space between said subunits.

6. The variable focus, mini-zoom projection lens of claim 1 wherein:

$$F>0.1.$$

7. The variable focus, mini-zoom projection lens of claim 1 wherein:

$$Z_{MAX}<0.1.$$

8. The variable focus, mini-zoom projection lens of claim 1 wherein the distortion of the projection lens over the focus range is less than or equal to one percent.

9. The variable focus, mini-zoom projection lens of claim 1 wherein the distortion of the projection lens over the focus range and the zoom range is less than or equal to a half of a percent.

10. The variable focus, mini-zoom projection lens of claim 1 wherein the lateral color blur of the projection lens over the focus range is less than a half a pixel for wavelengths in the range from 470 nanometers to 630 nanometers.

11. The variable focus, mini-zoom projection lens of claim 1 wherein the axial color blur of the projection lens over the focus range is less than two pixels for wavelengths in the range from 470 nanometers to 630 nanometers.

12. The variable focus, mini-zoom projection lens of claim 1 wherein the projection lens comprises at least one lens element composed of plastic and at least one lens element composed of glass.

13. The variable focus, mini-zoom projection lens of claim 1 wherein the projection lens comprises at least one aspheric surface.

14. The variable focus, mini-zoom projection lens of claim 1 wherein the panel has a characteristic spatial frequency in cycles/millimeter which is equal to one over twice the pixel size in millimeters and the modulation transfer function of the projection lens at said characteristic spatial frequency changes by less than about twenty-five percent as the projection lens is heated from room temperature to its operating temperature.

15. A projection lens system for forming an image of an object, said system comprising:

(a) an illumination system comprising a light source and illumination optics which forms an image of the light source, said image of the light source being the output of the illumination system;

(b) a pixelized panel which comprises the object; and (c) the variable focus, mini-zoom projection lens of claim 1.

16. The projection lens system of claim 15 wherein said projection lens has an entrance pupil whose location substantially corresponds to the location of the output of the illumination system.

* * * * *